July 20, 1926.

C. O. GUERNSEY 1,593,531

POWER TRANSMITTING MECHANISM FOR RAILWAY MOTOR COACHES

Filed April 25, 1925

Inventor:
Charles O. Guernsey
by his Attorneys.
Howson + Howson

July 20, 1926.

C. O. GUERNSEY

POWER TRANSMITTING MECHANISM FOR RAILWAY MOTOR COACHES

Filed April 25, 1925   5 Sheets-Sheet 4

1,593,531

Inventor.
Charles O. Guernsey.
by his Attorneys.-
Howson + Howson

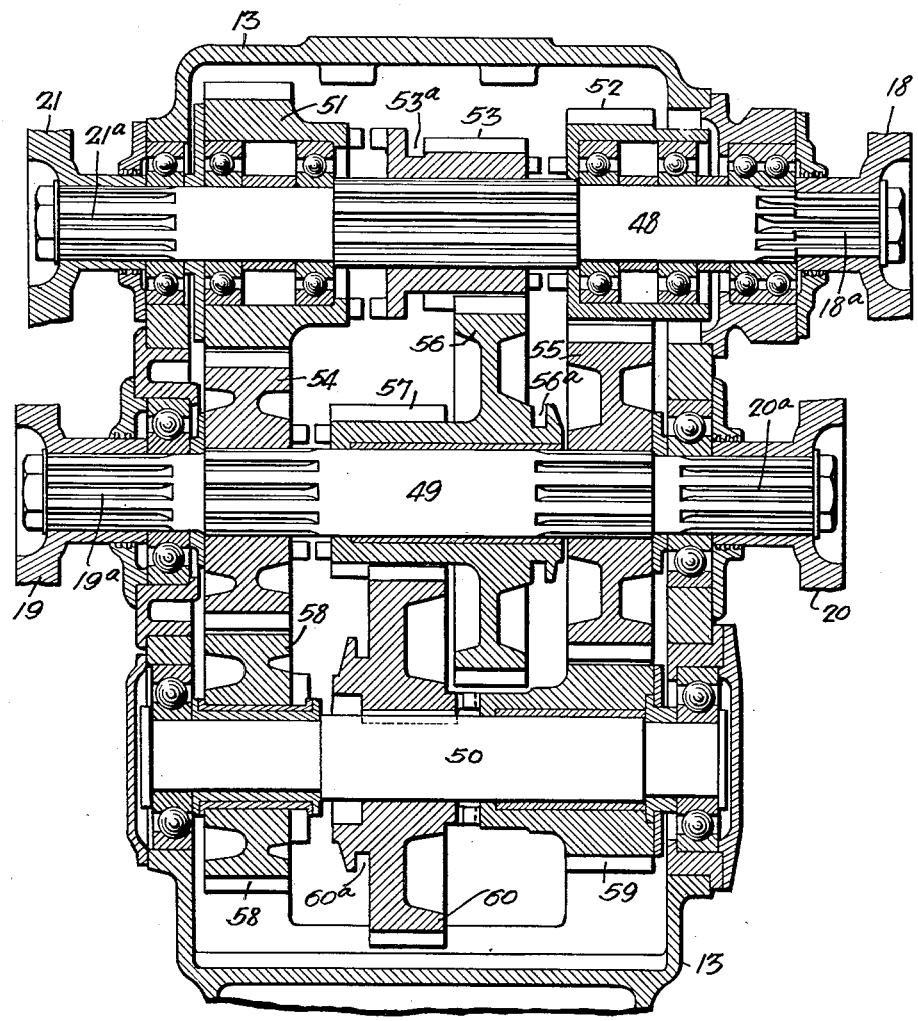

Patented July 20, 1926.

1,593,531

UNITED STATES PATENT OFFICE.

CHARLES O. GUERNSEY, OF PHILADELPHIA, PENNSYLVANIA.

POWER-TRANSMITTING MECHANISM FOR RAILWAY MOTOR COACHES.

Application filed April 25, 1925. Serial No. 25,813.

This invention relates particularly to self-propelled railway cars or coaches of the type in which power is supplied from a motor or engine mounted on the car body, this ordinarily being an internal combustion engine. From the motor or engine power is transmitted to the wheels of one of the car trucks by suitable power transmitting mechanism. Cars of this type are shown and described in my patent for railway motor coach, No. 1,544,574, dated July 7, 1925, and in my patent for drive for auxiliary apparatus, No. 1,528,373, dated March 3, 1925.

The principal object of the invention is to provide a power transmitting mechanism for a coach of the type described, having an improved arrangement of the speed changing gearing and of the reversing gearing, whereby certain advantages in manufacture and operation are secured. Further objects of the invention will be apparent from the following specification and claims.

In the accompanying drawings I have shown the embodiment of the invention which I now deem preferable. It will be understood, however, that the invention can be embodied in other ways and that the form shown has been selected merely for purposes of illustration. Various changes and substitutions may be made within the scope of the claims without departing from the spirit of the invention.

Of the drawings:—

Fig. 5 is a sectional view of the speed changing gearing, this view being taken along the line 5—5 of Fig. 4.

Figure 1:
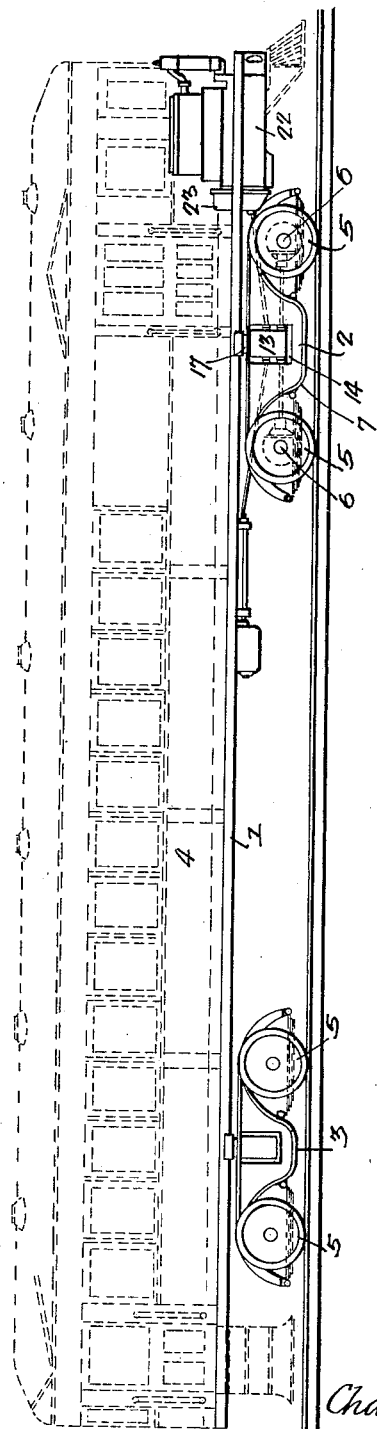
Fig. 1 is a right side view of a coach embodying the invention. The running gear and power plant of the coach are shown in full lines and the coach body is shown in dotted lines.

Referring particularly to Fig. 1 of the drawings, 1 represents the frame of the coach, 2 the front truck and 3 the rear truck. The trucks are pivotally connected with the frame in order to permit swiveling in the usual manner. The body of the coach is represented at 4 and this may be of any usual or preferred construction.

Figure 2:
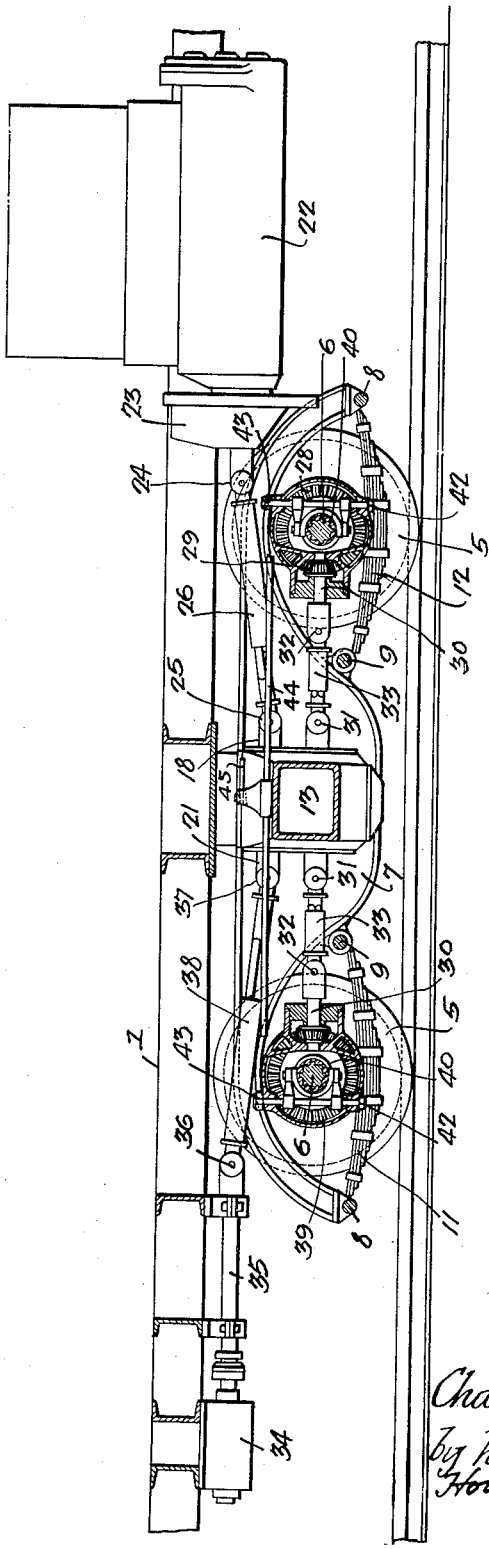
Fig. 2 is a side view on an enlarged scale of the front truck and a part of the power plant. This view is partly in section along the line 2—2 of Figure 3.
Figure 3:
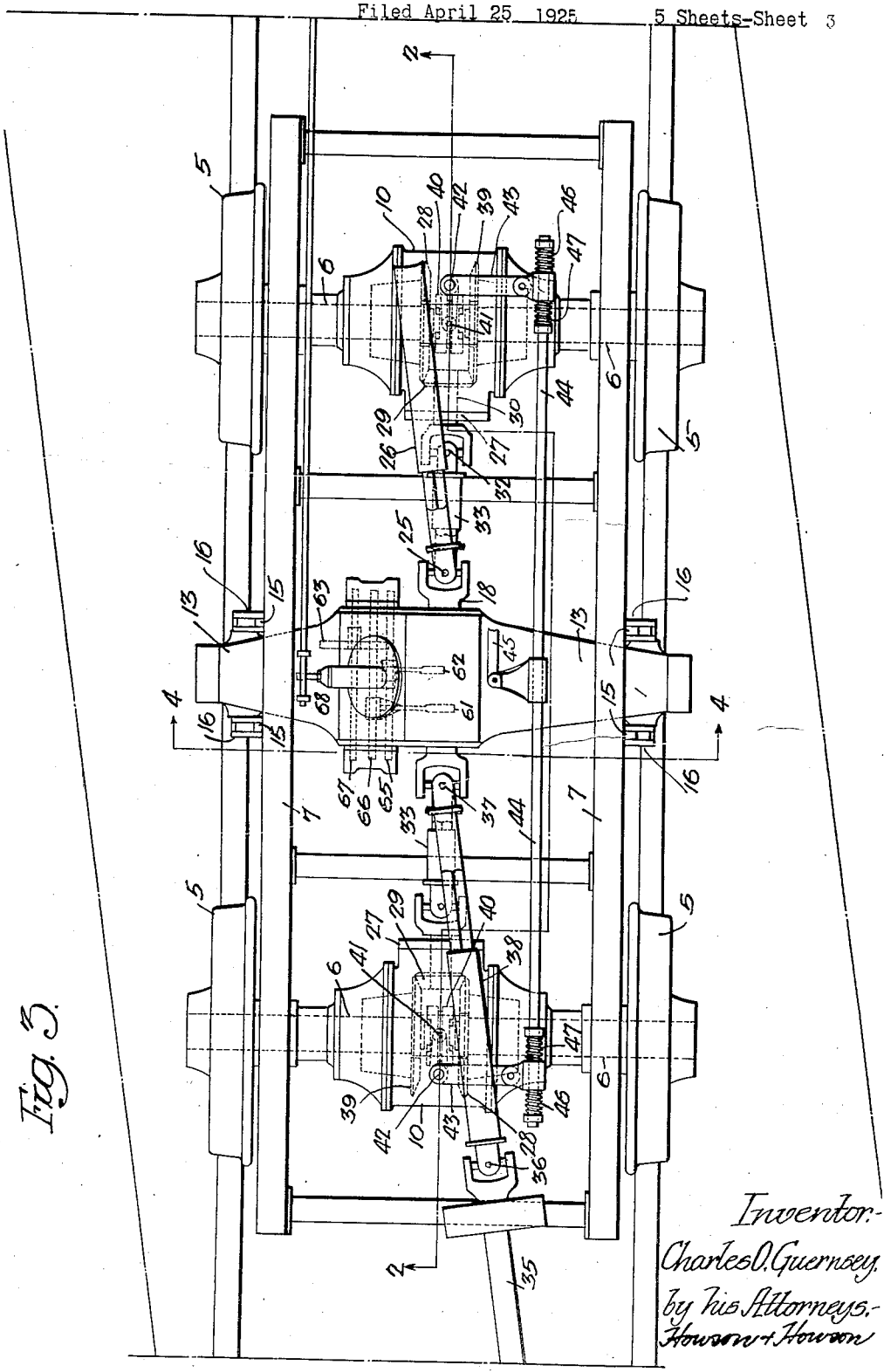
Fig. 3 is a plan view of the truck shown in Fig. 2.
Figure 4:
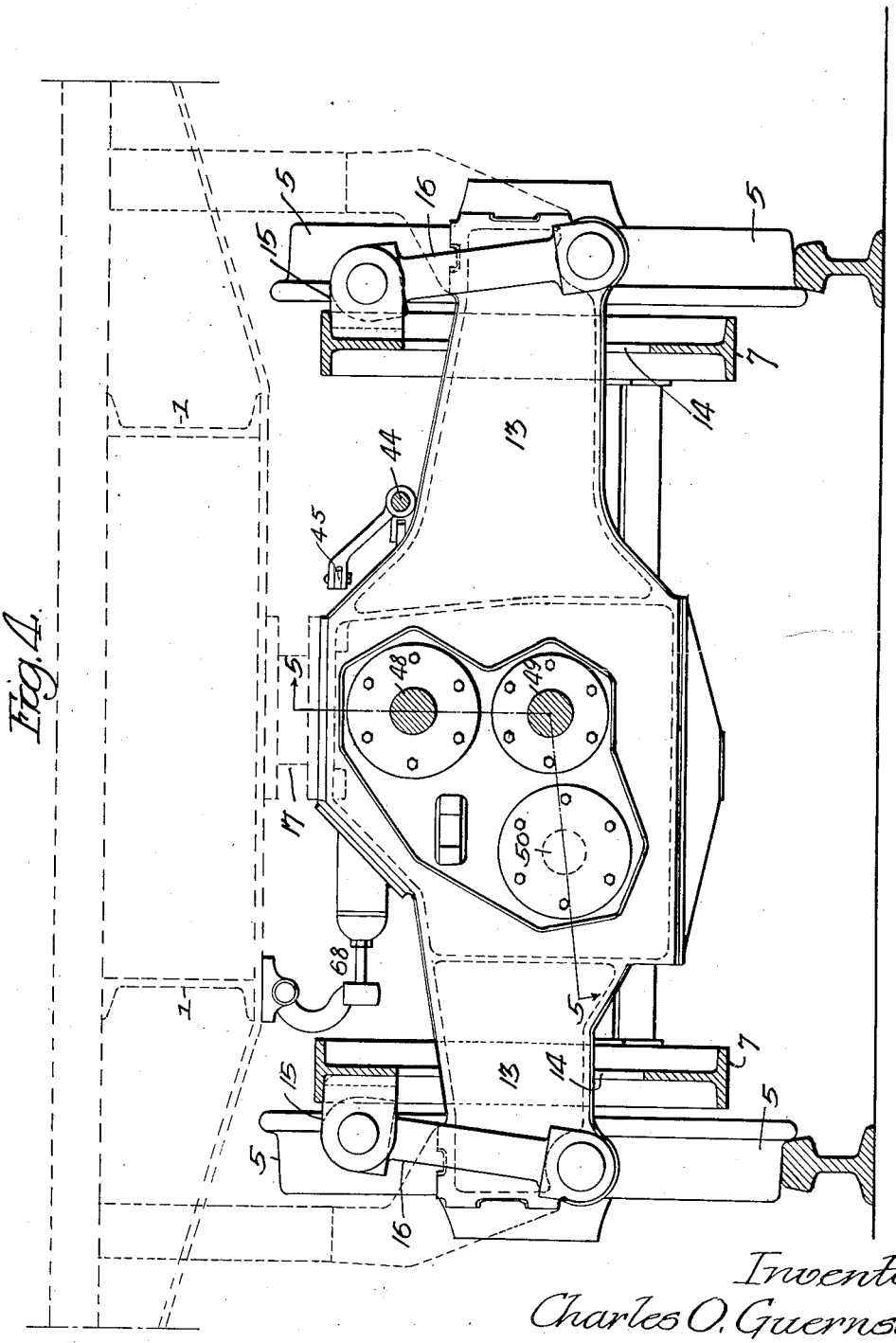
Fig. 4 is a transverse view of the bolster, this view being taken along the line 4—4 of Fig. 3. The bolster itself is shown in full lines and the other associated parts are shown in dotted lines.

As shown more clearly in Figs. 2, 3 and 4 of the drawings, the wheels for the front truck are represented at 5, 5, these being rigidly connected with axles 6, 6. The main frame of the truck includes two side members 7, 7 which are arched as shown to provide spaces for the axles and springs. These side members are connected by cross rods 8, 8 and also by cross bar 9, 9. The axles 6, 6 are provided with housings 10, 10 having suitable bearings for the axles and these housings are connected respectively to leaf springs 11 and 12. The springs 11 and 12 are connected with the two side members of the frame. A transverse bolster 13 is provided and this extends entirely across the truck and at its ends projects through apertures 14, 14 in the side members 7, 7 of the frame. Brackets 15, 15 project outward from both of the side members 7, 7 and to the brackets are pivotally connected links 16, 16 which extend downward and at their lower ends are pivotally connected with the outer ends of the bolster 13. These links are inclined somewhat as clearly shown in Fig. 4, thus tending to centralize the bolster and reduce side sway to a minimum. The main car or coach frame 1 is carried on the bolster 13, a pivotal connection of any usual or preferred type being provided at 17.

The member 13 while described as a bolster also serves as a casing for the speed changing gearing which will be described. This speed changing or power transmitting mechanism includes a power receiving member 18 rotatable about a central longitudinal axis, and two power transmitting members, 19 and 20, both rotatable about a longitudinal axis parallel to and preferably vertically below the axis of the member 18. Preferably there is also a secondary power transmitting member 21 which is rotatable about the same axis as the drive member 18.

The motor for the coach is shown at 22 and this may be of any usual or preferred type. Ordinarily an internal combustion engine is used for cars of this type. The engine itself constitutes no part of the present invention and it will not be described in detail. A manually controllable clutch of any desired type is provided, this being mounted in a casing or housing at 23. Power is transmitted from the driven element of the clutch to the driving member 18 by suitable flexible connections which include universal joints 24 and 25, and a shaft 26 which consists of two telescopically connected parts.

Each axle housing 10 encloses two meshing bevel gears 28 and 29 mounted respectively on the axle and on a short longitudinal drive shaft 30. The shaft 30 is carried in the housing 10 by means of a suitable bearing 27. Power is transmitted to the shafts 30 from the respective drivers 19 and 20 by means of universal joints 31 and 32 and by means of shafts 33, each of which consists of two telescopically connected parts.

In many cases it is necessary to provide an auxiliary mechanism to be driven from the motor. This auxiliary mechanism may be an electric generator for lighting and similar service, or it may be an air compressor for braking, or it may be some other unit. This auxiliary mechanism can most conveniently be mounted on the main frame of the coach and in the drawings I have shown an electric generator 34 which is so mounted. 35 is a drive shaft also mounted on the main frame and this drive shaft is connected with the auxiliary drive member 21 by means of universal joints 36 and 37, and a shaft 38 which consists of two telescopically connected parts.

From an examination of the drawings, particularly Figs. 2 and 3, it will be clear that the drive mechanism which I have shown and described makes it possible for the car frame to move relatively to the truck frame without in any way disturbing the power connection. As very clearly illustrated in Fig. 3, the truck can swing to a considerable angle with respect to the car body, this relative swinging being accommodated by the universal joints 24 and 25 and the telescopic shaft 26, and also by the universal joints 36 and 37 and the telescopic shaft 38. Any relative vertical movement of the car axles within the limits of action of the springs 11 and 12 is accommodated and compensated for by the universal joints 31 and 32 and by the telescopic shafts 33.

It is one of the features of the invention to provide a mechanism associated with at least one of the axles 6, 6. Preferably two such mechanisms are provided. As illustrated each housing 10 encloses not only a gear such as 28 already described, but also a second gear 39 which is also mounted on the axle 6 and is rotatable in the opposite direction. The two gears 28 and 39 are preferably bevel gears both meshing with the driving bevel gear 29. The two gears 28 and 29 are so mounted and connected that power can be transmitted through either of them to rotate the axle, and an axially shiftable member is provided to operatively connect one or the other of them. As illustrated the two gears are not rigidly connected with the axle but are so mounted that they can rotate freely thereon. Mounted between the two gears 28 and 29 is a shiftable member in the form of a toothed clutch element 40 which is splined to the axle and which is movable in either direction to engage clutch teeth on the gear 28 or clutch teeth on the gear 29. It will be clear that by moving this clutch element into engagement with one or the other of the gears the axle can be made to rotate in either direction.

Inasmuch as there are two reversing mechanisms it will be clear that provision must be made for adjusting or shifting them in unison. As illustrated, I provide a yoke 41 pivotally connected with the clutch element 40 on the forward axle. This is pivotally connected with the housing at 42 and carries a laterally projecting lever 43. A similar construction is provided for the rear axle and the two levers 43 are connected by a link 44. A reach rod, such as 45, connects the link 44 with a suitable operating lever on the coach body. By shifting this lever in one direction or the other the operator can throw the clutch members 40 simultaneously in opposite directions and thus engage the proper bevel gears so as to adapt the coach for travel forward or backward as desired.

It may sometimes happen that the teeth at one or both of the clutches 40 may be in such position as to not immediately engage when the operating lever is thrown. I, therefore, prefer to provide springs 46 and 47 interposed between the link 44 and the respective levers 43, 43. With this construction one of the springs is compressed in case either one of the clutches does not immediately engage. However, as soon as power is applied to cause relative movement, the compressed spring immediately throws the clutch into engagement.

The details of the speed changing power transmission mechanism do not constitute a part of the present invention, but are covered in my copending application for Power Transmitting Gearing Ser. No. 25,812, filed on even date herewith. However, this transmitting gearing will be briefly described in order that the present invention may be fully understood.

Referring to Fig. 5, it will be understood that the several driving and driven members 18, 19, 20 and 21 of the power transmitting mechanism are secured respectively to the shafts 48 and 49 at $18^a$, $19^a$, $20^a$ and $21^a$.

as indicated. A third back gear shaft 50 is also provided and all three of the shafts are mounted in suitable bearings, preferably ball bearings, carried by the walls of the bolster 13. Preferably, as indicated in Fig. 4, the shafts 48 and 49 are located in the central longitudinal plane of the bolster vertically below the pivotal axis at 17. The shaft 50 is located at one side.

Rotatably mounted on the shaft 48 by means of suitable bearings are gears 51 and 52 of different diameters, the former being somewhat larger than the latter. Splined on the shaft 48 between the gears 51 and 52 is a gear 53 having clutch teeth at its ends adapted respectively to engage with similar clutch teeth on the ears 51 and 52.

Rigidly secured to the shaft 49 are gears 54 and 55 meshing respectively with the gears 51 and 52. Rotatably and slidably mounted on the shaft 49 between the gears 54 and 55 are two connected gears 56 and 57 of which the former meshes with the gear 53. At the end of the gear 57 are clutch teeth adapted to engage similar clutch teeth on the gear 54.

Rotatably mounted on the shaft 50 are gears 58 and 59, meshing respectively with the gears 54 and 55. Splined on the shaft 50 between the gears 58 and 59 is a gear 60 meshing with the gear 57. This gear is provided at each end with teeth adapted to engage respectively with teeth on the gears 58 and 59.

The mechanism for shifting the several gears is preferably as that shown in my copending application for gear shifting mechanism, Ser. No. 17,213, filed March 21, 1925. This shifting mechanism is shown diagrammatically in Fig. 3 and it comprises three operating forks, 61, 62 and 63, adapted respectively to enter grooves 60a, 53a and 56a formed in the respective shiftable gear members. These forks are carried respectively by longitudinally movable rods 65, 66 and 67, any one of which can be moved at the will of the operator by the mechanism indicated at 68. For the details of this mechanism reference can be had to my aforesaid copending application.

By means of the gearing described, five different speeds can be obtained as follows, it being understood that the shiftable gear members are in neutral unless otherwise specified:

1. With the gear 60 engaged with the gear 59, power is transmitted through gears 53, 56, 57, 60, 59 and 55.

2. With the gear 60 engaged with the gear 58, power is transmitted through the gears 53, 56, 57, 60, 58 and 54.

3. With the gear 57 engaged with the gear 54, power is transmitted through the gears 53 and 56.

4. With the gear 53 engaged with the gear 52 power is transmitted through the gears 52 and 55.

5. With the gear 53 engaged with the gear 51 power is transmitted through the gears 51 and 54.

As has already been stated, power is transmitted from the speed changing transmission mechanism at at least two points and usually at three points. The reversing mechanism for the axles is located beyond the speed changing mechanism and this makes it possible for the speed changing mechanism to operate always in the same direction regardless of the direction of movement of the car.

What I claim is:—

1. The combination with the main frame of a railway car, of two supporting trucks pivotally connected with the car and provided with axles; a motor on the main frame; speed changing gearing on one of the truck frames; a flexible power connection between the motor and the gearing; and power connections from the said gearing to one of the axles including a reversing mechanism associated with the said axle.

2. The combination with the main frame of a railway car, of two supporting trucks pivotally connected with the car and provided with axles, springs interposed between the truck axles and the corresponding truck frames; a motor on the main frame; speed changing gearing on one of the truck frames; a flexible power connection between the motor and the gearing; reversing gearing connected with one of the axles of the last said truck; and a flexible power connection between the speed changing gearing and the reversing gearing.

3. The combination with the main frame of a railway car, of two supporting trucks pivotally connected with the car and provided with axles; a motor on the main frame; speed changing gearing on one of the truck frames; a flexible power connection between the motor and the gearing; a reversing mechanism associated with one of the axles, the said mechanism including two gears rotatable in opposite directions and a member shiftable longitudinaly of the axle to connect one or the other of the gears for the transmission of power to the axle; and a power connection from the change speed gearing to the reversing mechanism.

4. The combination with the main frame of a railway car, of two supporting trucks pivotally connected with the car and provided with axles; a motor on the main frame; speed changing gearing on one of the truck frames; a flexible power connecttion between the motor and the gearing, two driven bevel gears rotatably mounted on one of the axles; a driving bevel gear meshing with the said driven gears; a power connection from the said speed changing gearing to the said driving bevel gear; and means for clutching either of the driven bevel gears to the axle.

5. The combination with the main frame of a railway car, of two supporting trucks pivotally connected with the car and provided with axles; springs interposed between the truck axles and the corresponding frames; a motor on the main frame; speed changing gearing on one of the truck frames; a flexible power connection between the motor and the gearing; a reversing mechanism associated with one of the axles, the said mechanism including two gears rotatable in opposite directions and a member shiftable longitudinally of the axle to connect one or the other of the gears for the transmission of power to the axle; and a flexible power connection from the change speed gearing to the reversing mechanism.

6. The combination with the main frame of a railway car, of two supporting trucks pivotally connected with the car and provided with axles; a motor on the main frame; speed changing gearing on one of the truck frames; a flexible power connection between the motor and the gearing; and two separate power connections from the said gearing to the respective axles, each including a reversing mechanism associated with the corresponding axle.

7. The combination with the main frame of a railway car, of two supporting trucks pivotally connected with the car and provided with axles; springs interposed between the truck axles and the corresponding truck frames; a motor on the main frame; speed changing gearing on one of the truck frames; a flexible power connection between the motor and the gearing; and two separate flexible power connections from the said gearing to the respective truck axles, each including a reversing mechanism associated with the corresponding axle.

8. The combination with the main frame of a railway car, of two supporting trucks pivotally connected with the car and provided with axles; a motor on the main frame; speed changing gearing on one of the truck frames; a flexible power connection between the motor and the gearing; two separate power connections from the said gearing to the respective axles, each including a reversing mechanism associated with the corresponding axle, and a single means for adjusting the two reversing mechanisms simultaneously to change the direction of rotation.

9. The combination with the main frame of a railway car, of two supporting trucks pivotally connected with the car and provided with axles; a motor on the main frame; speed changing gearing on one of the truck frames; a flexible power connection between the motor and the gearing; two reversing mechanisms associated with the respective axles, each including two gears rotatable in opposite directions and a member shiftable longitudinally of the axle to connect one or the other of the gears for the transmission of power to the axle; two separate power connections from the change speed gearing to the respective reversing mechanisms; a single means connected with the two said shiftable members for moving them simultaneously and springs connected with the last said means and adapted to be momentarily compressed when resistance is offered to the movement of either shifting member.

10. The combination with the main frame of a railway car, of two supporting trucks pivotally connected with the car and provided with axles; a motor on the main frame; speed changing gearing on one of the truck frames; a flexible power connection between the motor and the gearing; two reversing mechanisms associated with the respective axles, each including two driven bevel gears mounted on the corresponding axle, a driving bevel gear meshing with the said driven bevel gears and a clutch member movable longitudinally of the axle for clutching either of the driven bevel gears to the axle; two separate power connections from the change speed gearing to the respective driving bevel gears; and means for shifting the two clutch members simultaneously and in opposite directions.

CHARLES O. GUERNSEY.